Patented July 11, 1933

1,918,042

UNITED STATES PATENT OFFICE

FERDINAND W. NITARDY, OF BROOKLYN, NEW YORK, AND JOHN J. ENRIGHT AND VINCENT S. WRENN, OF PITTSBURGH, PENNSYLVANIA, ASSIGNORS TO E. R. SQUIBB & SONS, OF NEW YORK, N. Y., A CORPORATION OF NEW YORK

LONGEVOUS CULTURES OF ACIDURIC BACTERIA

No Drawing. Application filed April 1, 1931. Serial No. 527,041.

Our invention relates to cultures of aciduric bacteria.

It has for some years been recognized by the medical profession that the implantation and proliferation of aciduric bacteria—for example, Lactobacillus, particularly *Lactobacillus acidophilus*—in the intestinal tract is beneficial when pathogenic or putrefactive organisms are present, and exercises a favorable effect on various disorders, including constipation.

However, cultures hitherto designed and marketed for accomplishing this implantation have been characterized by the early death of the major part of their bacilli, owing to the high concentration of lactic acid produced by them. Even in milk, authoritatively held to be the best medium, the micro-organism are decimated with such rapidity that their count is reduced to a small percentage in a few days. As a consequence of this instability, a considerable economic waste has been suffered; and daily distribution of fresh cultures has been rendered necessary, wherefore preparations of the fullest therapeutic value can be supplied only to communities situated within certain territorial limits. Moreover, the milk medium commonly employed for cultures is quickly soured by the metabolic processes of the bacteria, and thus rendered extremely unpalatable to many who would otherwise avail themselves of the treatment. Broth cultures flavored with fruit juices are known, but their bacteria are so ephemeral that such cultures have to be consumed in volumes about thirty times as great as those of fresh milk cultures to obtain the same effective dose.

It is an object of our invention to provide longer-lived cultures of aciduric bacteria than those hitherto known. A further object is to provide such longevous cultures optionally in media, of unobjectionable taste, other than milk. A still further object is to provide a method whereby these cultures may be prepared.

In the practice of our invention we maintain the cultures of aciduric bacteria in the presence of a buffer—by which term we mean to include all substances and/or conditions that, without impairing the viability of the micro-organisms, minimize change in the hydrogen-ion concentration of the medium—and thus, by arresting the growth of active acidity, prevent the formation of a lethal environment. We have found, for instance, that the application of an aliphatic-acid salt—say about one percent of an alkali-metal lactate—will accomplish our purpose; citrates, gluconates, adipates, and malates being among the other salts that may be used. Furthermore, these aliphatic-acid salts have a strong "anti-flocculent" effect: whereas the bacterial mass of liquid cultures would otherwise agglomerate and settle out, the presence of the salt causes the micro-organisms to remain uniformly suspended for long periods.

A specific example of the practice of our invention is as follows: A peptone-whey broth medium is first prepared by heating skimmed milk to between 85° and 90° C., enough ten-percent hydrochloric acid is added to precipitate all the casein, the whey is separated by filtration through several thicknesses of cheese-cloth, and, the reaction being adjusted to pH 6.0 with ten-percent sodium hydroxide, the whey is placed in flasks plugged with cotton, which are autoclaved at twenty pounds for thirty minutes; the lactalbumin settles, and after the supernatant whey is decanted and filtered, 5.0 grams of peptone is added to the liter of whey, the reaction is adjusted to pH 6.0, and sterilization is effected by autoclaving. Selection is made of an actively growing strain of *Lactobacillus acidophilus* of the desired type, which is passed through several successive transplants in sterile peptone-whey broth until a heavy seeding culture can be obtained by three or four days' incubation, when 100 cc. is transferred to the large flask containing one liter of sterile peptone-whey broth; and incubated at 37° C. for 72 hours. Then 25 cc. quantities of the culture are aseptically transferred to sterile 220 cc. bottles containing, sterile, 105 cc. of water, 40 cc. of 27.7° Baumé sucrose syrup, 8 cc. of true-fruit strawberry extract, and 22 cc. of 10.2% aqueous sodium lactate solution; and the bottles are sealed.

By the word "cultures" herein, we mean to include all potable and edible preparations containing live micro-organisms, for example in the form of liquids, pastes, gelatinized masses, or moist solids.

It is to be understood that the foregoing example is merely illustrative and by no means definitive of our invention, which within the scope of the appended claims may embody various types of micro-organisms, culture media (including milk), buffers, and processes, and may be employed in various industrial fermentative operations.

We claim:

1. The method of prolonging the life of cultures of Lactobacillus suitable for intestinal implantation which comprises maintaining them in the presence of a buffer consisting of an aliphatic-acid salt.

2. The method of prolonging the life of cultures of Lactobacillus suitable for intestinal implantation which comprises maintaining them in the presence of sodium lactate.

3. The method of prolonging the life of cultures of *Lactobacillus acidophilus* suitable for intestinal implantation which comprises maintaining them in the presense of a buffer consisting of an aliphatic-acid salt.

4. The method of prolonging the life of cultures of *Lactobacillus acidophilus* suitable for intestinal implantation which comprises maintaining them in the presence of sodium lactate.

5. Cultures of Lactobacillus suitable for intestinal implantation including a buffer consisting of an aliphatic-acid salt.

6. Cultures of Lactobacillus suitable for intestinal implantation including sodium lactate.

7. Cultures of *Lactobacillus acidophilus* suitable for intentinal implantation including a buffer consisting of an aliphatic-acid salt.

8. Cultures of *Lactobacillus acidophilus* suitable for intestinal implantation including sodium lactate.

9. Cultures of *Lactobacillus acidophilus* suitable for intestinal implantation, in media other than milk, including sodium lactate.

In witness whereof we affix our signatures.

FERDINAND W. NITARDY.
JOHN J. ENRIGHT.
VINCENT S. WRENN.